Patented Apr. 8, 1941

2,237,584

UNITED STATES PATENT OFFICE 2,237,584

HYDROXYALIPHATIC THIOAMMELINE ETHERS

Herman A. Bruson, Philadelphia, Pa., assignor to The Resinous Products & Chemical Company, Philadelphia, Pa.

No Drawing. Application August 19, 1939, Serial No. 291,012

9 Claims. (Cl. 260—248)

This invention deals with hydroxyaliphatic ethers of thioammeline and relates more particularly to the preparation of new compounds having a hydroxy- or polyhydroxy-aliphatic group of at least two carbon atoms attached to the sulfur atom of thioammeline.

This application is a continuation-in-part of my copending application Serial No. 283,740, filed July 11, 1939.

An object of this invention is to make available thioammeline ethers which possess a reactive hydroxyl group, permitting reaction not only of the triazine group with aldehydes but of the hydroxyl group with such reagents as acids to form esters or with other hydroxyl-bearing compounds to form ethers. It is also an object to provide compounds useful for the preparation of resins by reaction with aldehydes with or without the addition of polycarboxylic, resin-forming acids, drying oil acids, fatty acids, or alcohols, or the like. It is also an object to provide a resin-forming base which is useful in the preparation of resins in conjunction with other methylol-forming compounds such as urea, thiourea, dicyandiamide, melamine, phenols, sulfonamides, etc.

According to this invention, hydroxyaliphatic ethers of thioammeline are obtained by condensing thioammeline in alkaline solution with a member of the group consisting of alkylene halohydrins and polyalkylene ether halohydrins having at least two carbon atoms in each alkylene group.

Typical compounds of this group include ethylene chlorohydrin, propylene chlorohydrin, isobutylene chlorohydrin, glycerol monochlorohydrin, glycerol dichlorohydrin, β-methyl glycerol chlorohydrin, diethylene glycol chlorohydrin, triethylene glycol chlorohydrin, epichlorohydrin, β-methylepichlorohydrin, and higher homologues thereof, or with the corresponding bromohydrins. There may also be used the polyethylene glycol chlorohydrins having from about 10 to about 100 alkylene groups therein.

The condensation of one of the above compounds and thioammeline takes place readily in the presence of a water-soluble alkaline, acid-binding agent. In the preferred form of this invention thioammeline is dissolved in an aqueous solution of a water-soluble alkaline material such as sodium hydroxide, potassium hydroxide or the corresponding carbonates, and treated with a reacting proportion of the halohydrin. In some cases reaction starts at room temperatures. In other cases heat is required. In either event the reaction is accelerated by heating the mixture for several hours or more with rapid stirring. Heating under reflux at 70–100° C. is most convenient but higher temperatures may be used if heating is conducted under pressure. In practically all cases the product may be separated in crystalline or solid form. The products obtained are particularly valuable intermediates for the preparation of resins which they give upon condensation with an aldehyde, such as formaldehyde. They may be used in conjunction with urea, thiourea, melamine, and other methylol-forming compounds to improve the properties of resins formed therefrom. They may also be esterified with organic or inorganic acids, acid anhydrides or acid chlorides to give compounds useful as textile assistants, plasticizers, insecticides, or dye intermediates. They may be reacted with both an aldehyde and a resin-forming, polycarboxylic acid or a drying or non-drying, fatty acid to give resinous products for use in varnishes, lacquers, enamels, etc. and for use in conjunction with other resins, such as urea-formaldehyde, phenol-formaldehyde, etc. to which they impart improved water-resistance, plasticity, and other desirable properties. The condensates formed from the hydroxyaliphatic ethers of thioammeline, formaldehyde, and a hydroxyl-bearing compound, such as butyl alcohol, octyl alcohol, glucose, glycerine or a compound related to these, are of particular value as solvent-soluble resins with some degree of thermoplasticity. Also, the hydroxyaliphatic ethers of thioammeline may be reacted with an aldehyde in the presence of both an alcohol and an acid. These ethers themselves are useful in the form of their water-soluble or oil-soluble salts as bactericides, insecticides, vulcanization accelerators, additives for lubricating and rust-preventive compositions, etc.

The hydroxyaliphatic ethers of thioammeline may be represented by the formula

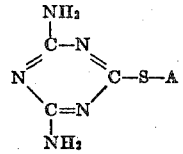

wherein A is a member of the class consisting of saturated aliphatic carbon chains having at least two carbon atoms and carrying at least one hydroxyl radical and saturated aliphatic carbon chains interrupted by oxygen, said chains carrying a hydroxyl group and having at least two carbon atoms between the sulfur atom and an oxygen atom and between successive oxygen atoms.

The following examples illustrate this invention:

Example 1

To a clear, filtered solution of 28.6 g. of thioammeline, 8 g. of sodium hydroxide and 300 cc. of water heated to 90° C. there was added gradually with stirring 16.1 g. of ethylene chlorohydrin. The mixture was stirred at this temperature for five minutes and was then cooled and allowed to stand. After standing for 48 hours, 32 g. of colorless crystals separated. This product upon recrystallization from hot water separates in colorless needles, M. P. 185–186° C., the analysis of which corresponds to the formula

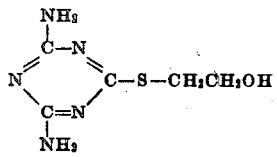

Example 2

To a clear, filtered solution of 28.6 g. of thioammeline, 8 g. of sodium hydroxide, and 300 cc. of water there was added all at once at 90° C. 19 g. of propylenechlorohydrin with rapid stirring. After the mixture was heated at 90–95° C. for 10 minutes, the hot solution was filtered. On cooling, the hydroxy propylthioammeline separated in colorless crystals which upon recrystallization from water melted at 179–180° C.

Example 3

Twenty-six grams of isobutylene chlorohydrin was added to a clear, filtered solution of 8 g. of sodium hydroxide, 300 cc. of water, and 28.6 g. of thioammeline. The mixture was stirred and heated to 90–95° C. for 30–40 minutes. The crystals which separated after standing for 24 hours weighed 32.5 g. After recrystallization from water they formed colorless prisms, M. P. 195–196° C., the analysis of which corresponds to the formula

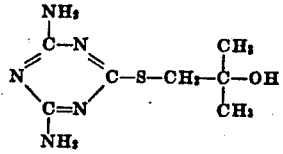

Example 4

To a clear, filtered solution of 14.3 g. of thioammeline, 4 g. of sodium hydroxide and 150 cc. of water there was added 10.5 g. of trimethylene chlorohydrin. The mixture was stirred and heated at 90–95° C. for 30–40 minutes. After it had stood 18 hours, there was obtained 15.6 g. of solid product which after recrystallization from water formed colorless crystals, M. P. 173–175° C., the analysis of which corresponds to the formula

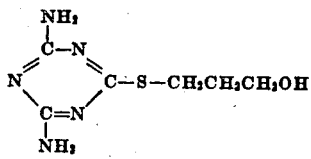

Example 5

To a clear solution of 28.6 g. of thioammeline, 8 g. of sodium hydroxide, and 275 cc. of water there was added 25 g. of diethylene glycol chlorohydrin ($ClC_2H_4$—$O$—$C_2H_4OH$). The mixture was stirred and heated at 90–95° C. for 40 minutes. After it had stood 24 hours, 34.5 g. of solid product separated which upon recrystallization from water formed colorless plates, M. P. 184–185° C., the analysis of which corresponds to the formula

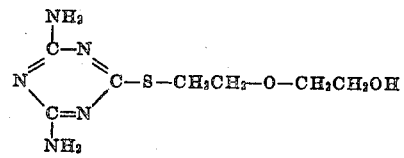

Example 6

To a solution of 28.6 g. of thioammeline, 8 g. of sodium hydroxide, and 250 cc. of water there was added 21.3 g. of β-methyl epichlorohydrin. After the solution was stirred and heated at 50–60° C. for a few minutes, the condensation product separated as a white powder which could not be recrystallized from water or organic solvents.

A similar amorphous material was obtained when β-methyl glycerol monochlorohydrin, glycerol dichlorohydrin, or glycerol monochlorohydrin was used in place of β-methyl epichlorohydrin.

I claim:

1. A hydroxyaliphatic ether of thioammeline having the formula

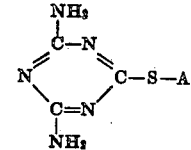

wherein A is a member of the class consisting of (1) a saturated aliphatic carbon chain having at least one hydroxyl radical and (2) a saturated aliphatic carbon chain interrupted by oxygen, said chain carrying a hydroxyl group and having at least two carbon atoms between the sulfur atom and an oxygen atom and between successive oxygen atoms.

2. A hydroxyaliphatic thioether of ammeline having at least two carbon atoms in the aliphatic residue.

3. Hydroxyethyl thioammeline having the formula

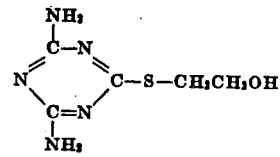

4. Hydroxyethoxyethyl thioammeline having the formula

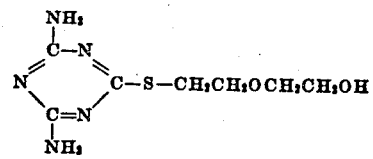

5. Hydroxy-tertiary-butyl thioammeline having the formula

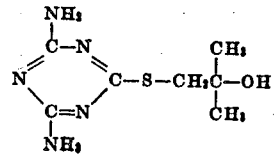

6. A process which comprises condensing thioammeline in alkaline solution with a member of the group consisting of alkylene halohydrins of at least two carbon atoms and polyalkylene ether halohydrins having at least two carbon atoms in each alkylene group.

7. A process which comprises condensing thioammeline in a solution of an alkali hydroxide with a member of the group consisting of alkylene halohydrins of at least two carbon atoms and polyalkylene ether halohydrins having at least two carbon atoms in each alkylene group.

8. A process which comprises condensing thioammeline in alkaline solution with an alkylene chlorohydrin.

9. A process which comprises condensing thioammeline in alkaline solution with ethylene chlorohydrin.

HERMAN A. BRUSON.